US010929351B2

(12) United States Patent
Tyebkhan et al.

(10) Patent No.: US 10,929,351 B2
(45) Date of Patent: Feb. 23, 2021

(54) DETERMINING DOCUMENT LIBRARIES TO SYNC TO A LOCAL COMPUTING DEVICE

(71) Applicant: Microsoft Technology Licensing, LLC, Redmond, WA (US)

(72) Inventors: Arwa Zoher Tyebkhan, Redmond, WA (US); Carlos G. Perez, Seattle, WA (US); Ronak M. Shah, Seattle, WA (US); Yee Hay Jonathan Leung, Seattle, WA (US); Joseph Anthony East, Redmond, WA (US); Michael Vincente Patruno, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 292 days.

(21) Appl. No.: 16/024,385

(22) Filed: Jun. 29, 2018

(65) Prior Publication Data
US 2020/0004841 A1      Jan. 2, 2020

(51) Int. Cl.
| | | |
|---|---|---|
| *G06F 16/178* | (2019.01) | |
| *G06F 16/93* | (2019.01) | |
| *G06F 16/176* | (2019.01) | |
| *G06F 16/16* | (2019.01) | |
| *G06F 16/172* | (2019.01) | |

(52) U.S. Cl.
CPC .......... *G06F 16/178* (2019.01); *G06F 16/168* (2019.01); *G06F 16/172* (2019.01); *G06F 16/176* (2019.01); *G06F 16/93* (2019.01)

(58) Field of Classification Search
CPC .... G06F 16/93; G06F 16/9535; G06F 16/168; G06F 16/176; G06F 16/178; G06F 16/954; G06F 16/285

USPC .......... 707/627, 640, 730, 736, 781
See application file for complete search history.

(56) References Cited

U.S. PATENT DOCUMENTS

| | | |
|---|---|---|
| 9,069,444 B1 | 6/2015 | Hansen et al. |
| 9,262,435 B2 | 2/2016 | Vibhor et al. |
| 9,307,006 B2 | 4/2016 | Micucci et al. |
| 9,413,824 B1 | 8/2016 | Newhouse |
| 9,749,412 B1 | 8/2017 | Bostick et al. |
| 9,990,365 B1 * | 6/2018 | Kilpatrick ............. G06F 16/119 |
| 2013/0212067 A1 | 8/2013 | Piasecki et al. |

(Continued)

OTHER PUBLICATIONS

"Colligo Engage Windows App 7.0 User Guide Colligo Engage Windows App Contents", Retrieved From: https://www.colligo.com/support/media/document/Colligo_Engage_Windows_App.pdf, Sep. 10, 2014, 44 Pages.

(Continued)

*Primary Examiner* — Dangelino N Gortayo
(74) *Attorney, Agent, or Firm* — Michael Best & Friedrich LLP

(57) ABSTRACT

Systems and methods for determining a document library to sync to a local computing device. In one example, the method includes determining, with an electronic processor, one or more document libraries associated with a user; determining, with the electronic processor, a heuristic for each of the one or more document libraries; and determining, with the electronic processor, a subset of the one or more document libraries to sync to a local computing device associated with the user, wherein the subset is determined based upon the heuristic.

20 Claims, 4 Drawing Sheets

(56) References Cited

U.S. PATENT DOCUMENTS

| | | | | |
|---|---|---|---|---|
| 2014/0297593 | A1* | 10/2014 | Baumann | G06F 11/1464 |
| | | | | 707/640 |
| 2016/0191432 | A1* | 6/2016 | Panchapakesan | G06F 16/972 |
| | | | | 709/206 |
| 2017/0075919 | A1* | 3/2017 | Bose | G06F 21/6245 |
| 2017/0316074 | A1 | 11/2017 | Fisher | |
| 2018/0081987 | A1* | 3/2018 | Walther | G06F 16/9024 |
| 2019/0095802 | A1* | 3/2019 | Raphael | G06Q 30/0283 |
| 2019/0179494 | A1* | 6/2019 | Colagrosso | G06F 3/0482 |

OTHER PUBLICATIONS

Degroot, P B., "ChronoSync File Synchronization and Backup Application", Retrieved From: https://1pdf.net/chronosync-file-synchronization-and-backup-application-ashmug_5859ddbbe12e89777e9fae02, Jul. 14, 2009, 14 Pages.

"International Search Report and Written Opinion Issued in PCT Application No. PCT/US19/039724", dated Sep. 6, 2019, 13 Pages.

"Selective sync: save hard drive space by choosing which folders sync to your computer", Retrieved from: https://www.dropbox.com/help/syncing-uploads/selective-sync-overview, Retrieved on May 11, 2018, 6 Pages.

Perez, Sarah, "Microsoft blurs the line between desktop and cloud with OneDrive update", Retrieved from: https://techcrunch.com/2017/05/11/microsoft-blurs-the-line-between-desktop-and-cloud-with-onedrive-update/, May 11, 2017, 9 Pages.

\* cited by examiner

DETERMINING DOCUMENT LIBRARIES TO SYNC TO A LOCAL COMPUTING DEVICE

FIELD

Embodiments described herein relate to systems and methods for determining a document library to sync to a local computing device.

SUMMARY

Collaboration platforms, for example, Microsoft's SharePoint system, include document management and storage capabilities. These platforms also provide tools to support collaboration among users, for example, co-authoring tools, shared mailboxes, project scheduling, shared content, and team sites. A team site may include web pages; document, video, and other libraries; software applications; and other items. Users may be associated with multiple team sites and libraries. These users may also own or otherwise be associated with a set of user devices, such as laptop computers, tablets, mobile devices, and the like. If a user frequently accesses these libraries, the user may wish to sync their own user devices with files from the libraries they are associated with.

Because a user may be associated with a large number of libraries (each of which may contain a large number of files), the user may spend a lengthy amount of time searching through each library to determine which files are needed or relevant and that should be synced to the user's local devices. A system is needed to automatically determine which libraries the user would like to sync to his or her user devices.

Embodiments described herein provide, among other things, systems and methods for determining a library to sync to a local computing device. In the description that follows, the term "document library" may be used, but it should be understood that a document library is just one example. As noted above, a library may include documents, video, audio, and various media content.

One example provides a system for determining a document library to sync to a local computing device. The system includes an electronic processor configured to determine one or more document libraries associated with a user; determine, for each of the one or more document libraries, a heuristic; and determine, based upon the heuristic, a subset of the one or more document libraries to sync to a local computing device associated with the user.

Another embodiment provides a method for determining a document library to sync to a local computing device. The method includes determining, with an electronic processor, one or more document libraries associated with a user; determining, with the electronic processor, a heuristic for each of the one or more document libraries; and determining, with the electronic processor, a subset of the one or more document libraries to sync to a local computing device associated with the user, wherein the subset is determined based upon the heuristic.

DETAILED DESCRIPTION

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in a non-transitory, computer-readable medium. Similarly, embodiments described herein may be implemented as a non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. In addition, relational terms such as first and second, top and bottom, and the like may be used herein solely to distinguish one entity or action from another entity or action without necessarily requiring or implying any actual such relationship or order between such entities or actions.

Figure 1:
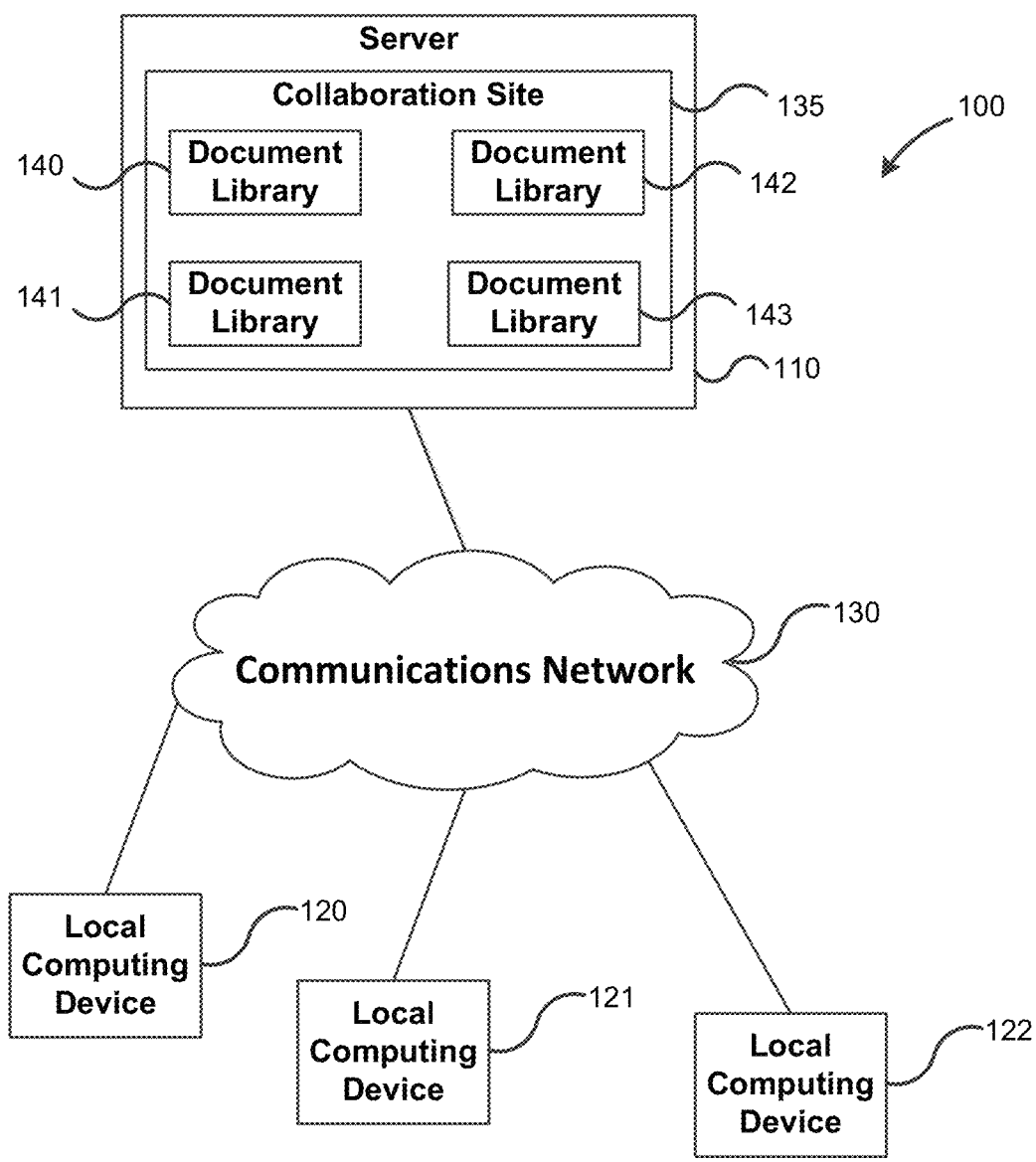
FIG. 1 schematically illustrates a system for determining a document library to sync to a local computing device according to one embodiment.

FIG. 1 schematically illustrates a system 100 for determining a document library to sync to a local computing device according to one embodiment. As illustrated in FIG. 1, the system 100 includes a server 110 and a local computing device 120. It should be understood that the system 100 is provided as an example and, in some embodiments, the system 100 may include additional components. For example, the system 100 may include multiple servers 110, multiple local computing devices 120 (such as local computing devices 121 and 122), or a combination thereof.

The server 110 may include one or more electronic processors, one or more memories, one or more input-output interfaces, one or more communication interfaces, and the like.

The server 110 and the local computing devices 120 are communicatively coupled via a communications network 130. The communications network 130 may be implemented using a wide area network, such as the Internet and various wired and wireless networks, a local area network, for example, a Wi-Fi network, and personal area networks, for example, a Bluetooth™ network. In some embodiments, rather than or in addition to communicating over the communications network 130, the server 110, and local computing device 120 may communicate over one or more dedicated (wired or wireless) connections. In addition, in some embodiments, the server 110 and the local computing device 120 may communicate over one or more intermediary devices, such as routers, servers, gateways, relays, and the like.

The server 110 stores a collaboration site 135 in a memory. The collaboration site 135 is a web site or other remote location accessible to a group of users for the purpose of collaborating on work products.

The collaboration site 135 includes at least one document library 140-143 in a memory. For the purpose of the current application, a document library is considered to be a collection of files (such as text documents, spreadsheets, presentations, and the like), images, and data accessible to a plurality of users for the purposes of collaborating with respect to the document library 140 and its contents. The document libraries 140-143 also include a list of users associated with each of the document libraries 140-143. In some embodiments, the server 110 only stores one document library. Each of the document libraries 140-143 includes different content. This allows for users to be associated with a subset of the plurality of document libraries 140-143 and collaborate with other users on multiple projects associated with the plurality of document libraries 140-143.

The document libraries 140-143 are organized in virtual folders and the document libraries 140-143 are presented, for example, as part of a graphical user interface in which the virtual folders and file names are displayed. Each item in the document libraries 140-143 is considered a content item. In the document libraries 140-143, for example, a content item may include a document having metadata. The metadata includes, for example, a name and a contact. A contact may include contact information fields.

Figure 2:
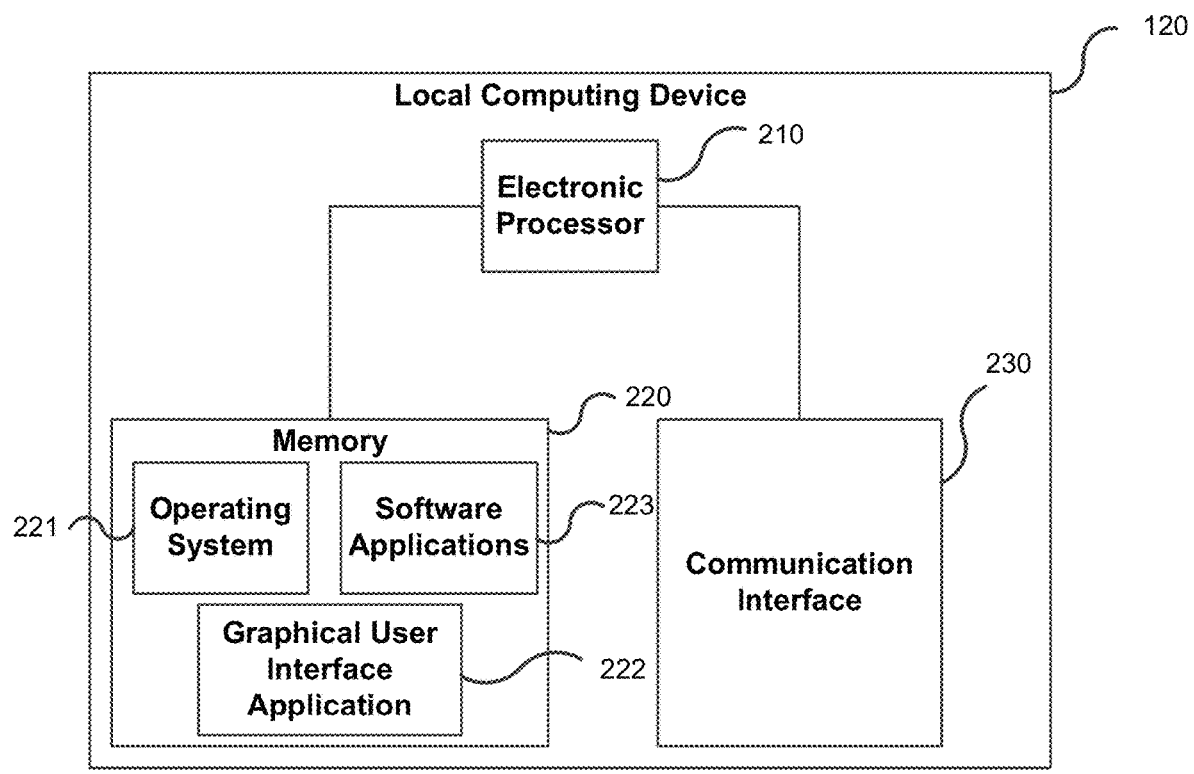
FIG. 2 schematically illustrates a local computing device according to one embodiment.

FIG. 2 schematically illustrates the local computing device 120 in more detail. The local computing device 120 is a personal computing device (for example, a desktop computer, a laptop computer, a terminal, a tablet computer, a smart telephone, a wearable device, or the like). In some embodiments, the local computing device 120 also includes one or more I/O devices or human-machine interfaces, for example a display, a touchscreen, a keyboard, a keypad, a cursor-control device, and the like. In some embodiments, the local computing device 120 allows a user to access functionality provided by the server 110 via the communications network 130. The user device 120 may access the functionality provided by the server 110 using a browser application, a dedicated software client, or the like.

As illustrated in FIG. 2, the local computing device 120 generally includes an electronic processor 210, a memory 220, and a communication interface 230. The electronic processor 210, the memory 220, and the communication interface 230 communicate over one or more communication lines or buses, wirelessly, or a combination thereof. In some embodiments, the local computing device 120 includes additional components than those illustrated in FIG. 2 and the components included in the local computing device 120 may be arranged in various configurations. The local computing device 120 may also perform additional functionality than the functionality described herein.

The electronic processor 210 may include a microprocessor, application-specific integrated circuit (ASIC), programmable gate array, or another suitable electronic device. In one instance, the electronic processor 210 is configured to retrieve data from the memory 220 and execute, among other things, software related to the processes and methods described herein.

The memory 220 includes a non-transitory, computer-readable storage medium. The memory 220 stores an operating system 221, a graphical user interface application 222, and other software applications 223. The graphical user interface application 222 allows the local computing device 120 to display, via a display screen or similar device, a graphical user interface to a user.

The communication interface 230 may include a transceiver (for example, a Wi-Fi or Ethernet transceiver) for communicating over the communications network 130 and, optionally, one or more additional wired or wireless communication networks or connections.

Figure 3:
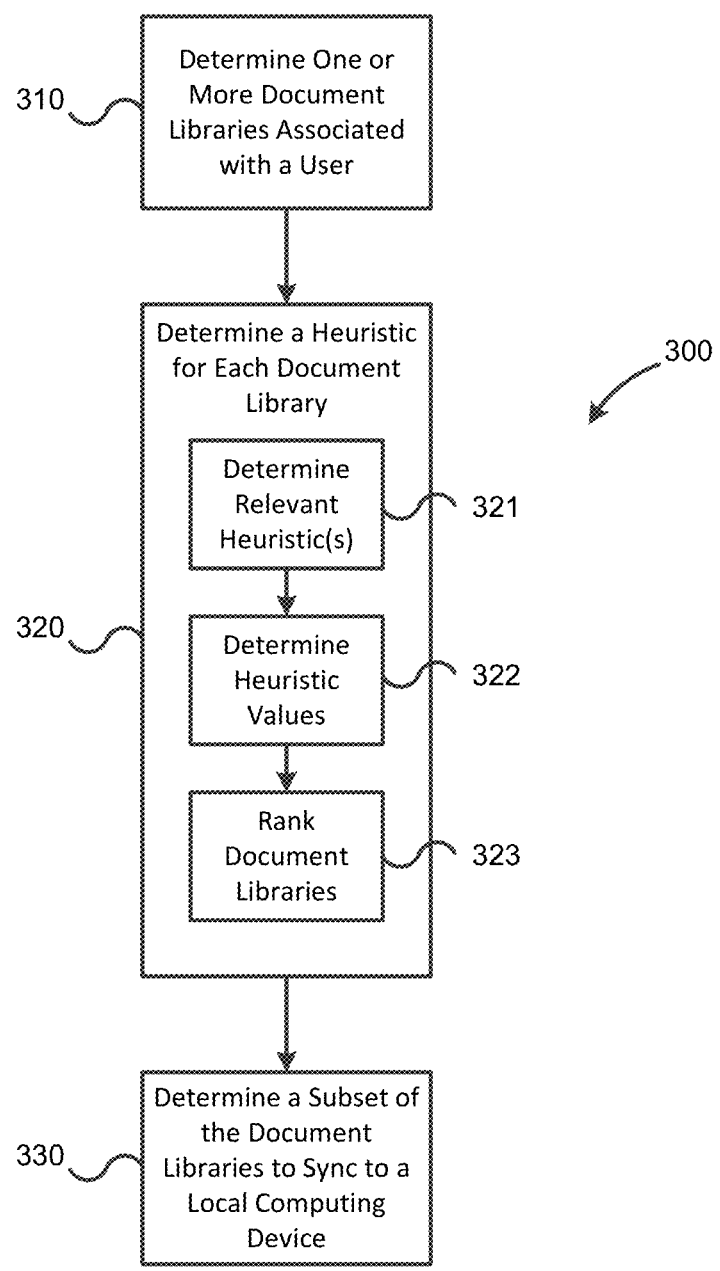
FIG. 3 is a flow chart illustrating a method for determining a document library to sync to a local computing device according to one embodiment.

FIG. 3 illustrates a method 300 of determining a document library to sync to the local computing device 120 according to one embodiment.

The method 300 includes determining, with the electronic processor 210, one or more document libraries stored on the server 110 that are associated with a user (at block 310). For example, the electronic processor 210 determines that the user has worked on the document library 140 by contributing to a file, an image, or otherwise interacting with the document library 140. In some embodiments, the electronic processor 210 determines whether the user has viewed the document library 140 and a time that the user accessed or viewed the document library 140.

In some embodiments, the electronic processor 210 only determines that the user is associated with the document library 140 if the user has permission to edit documents, files, images, or data stored in the document library 140.

The method 300 also includes determining, with the electronic processor 210, a heuristic associated with each document library (at block 320). The heuristic for each document library indicates if the document library should be synced with the local computing device 120. In general, the heuristic is used to indicate how much the user interacts with each of the document libraries and indicates what document libraries the user may wish to sync to their user device 120.

For example, the electronic processor 210 determines a most recent access time of each of the document libraries by the user in order to determine the heuristic (for example, more recently accessed document libraries are ranked higher). In other embodiments, the electronic processor 210 determines the heuristic based upon a number of times the user has accessed each of the document libraries (for example, has opened and/or saved a document, a file, an image, or other data in the document library). In other examples, the electronic processor 210 determines the heuristic based upon a number of times the user accesses each of the document libraries within a defined period of time (such as in the last month, last year, and the like).

In some embodiments, the heuristic is based upon a number of documents the user has opened on each of the document libraries or how many documents the user currently has open from each of the document libraries on a different computing machine associated with the user (for example, a different laptop computer, mobile device, and the like).

In some embodiments, the heuristic is based upon a number of documents the user has favorited in each of the document libraries. For example, the user may select favorite documents and files (such as important documents or files or files that need to be reviewed).

In some embodiments, the user is part of a plurality of users (such as a development team, work department, and the like). In these embodiments, the electronic processor 210 may determine the heuristic for each of the document libraries based upon the activity of the plurality of users. For example, the electronic processor 210 may determine the heuristic based upon a number of times any of the plurality of users has accessed each of the document libraries. In other embodiments, the electronic processor 210 determines the heuristic based upon a most recent access time of each of the plurality of document libraries.

Block 320, in some embodiments, includes sub-steps to determining the heuristic for each document library. For example, the electronic processor 210 may be configured to first determine relevant heuristics for each document library (at block 321).

Each document library has a large number of potential heuristics to be determined (some of which are discussed above). Therefore, the electronic processor 210 may be configured to determine which heuristics are the most likely to indicate that a user or group of users desires to sync a particular document library. For example, if a group of users edits a large number of documents, the electronic processor 210 determines that a number of edited documents is a more relevant heuristic than, for example, a most recent access time or number of documents open. In some embodiments, the electronic processor 210 determines a plurality of relevant heuristics for each user or group of users.

The electronic processor 210 may also be configured to determine heuristic values for each of the relevant heuristics (at block 322). For example, the electronic processor 210 is configured to assign a numerical value to each of the heuristics associated with the associated document library. By determining numerical values for each of the heuristics, the electronic processor 210 is able to determine which heuristics are most indicative of a document library the user or group of users would wish to sync to the local computing device 120.

The electronic processor 210 may further be configured to rank the document libraries based upon the determined heuristic values (at block 323). By ranking the document libraries based upon the determined heuristic values, the electronic processor 210 can suitably select a subset of document libraries to sync to the local computing device 120 (as discussed below). The electronic processor 210 may also present the document libraries in a ranked order to the user via a graphical user interface (as discussed below).

The method 300 also includes determining, with the electronic processor 210, a subset of the plurality of document libraries to sync to the local computing device 120 based upon the heuristic for each of the document libraries (at block 330).

For example, after each of the heuristics are determined for each of the plurality of document libraries, the electronic processor 210 determines which of the plurality of document libraries are most frequently used based upon the heuristic and adds these document libraries to the subset.

Figure 4:
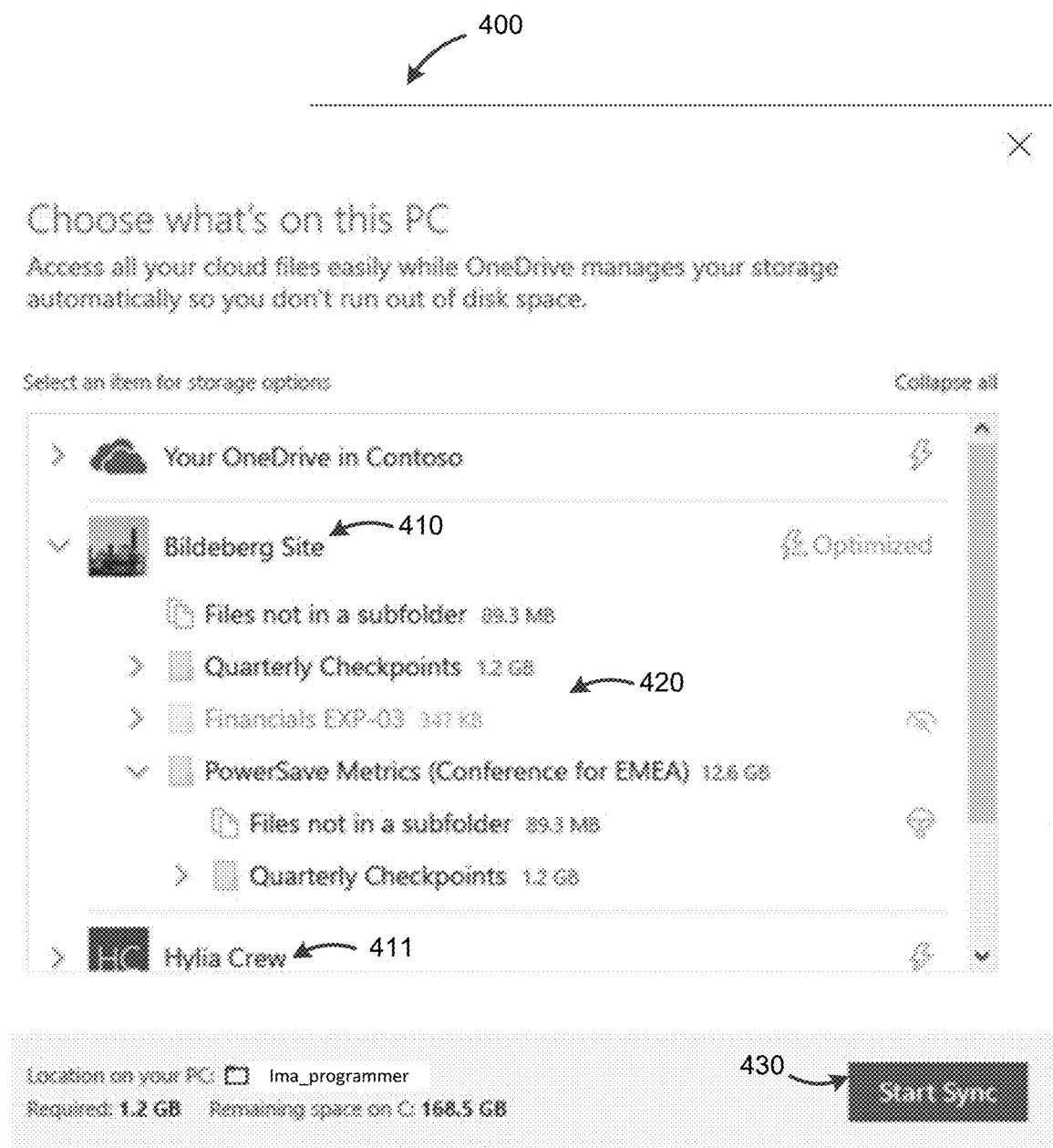
FIG. 4 illustrates a graphical user interface according to one embodiment.

In some embodiments, the electronic processor 210 is further configured to display, using a display of the local computing device 120, the subset of document libraries to the user. For example, FIG. 4 illustrates a graphical user interface 400 showing different document libraries 410-411 with each document library's respective folders 420. By displaying the subset of document libraries to the user, the electronic processor 210 shows the user which document libraries can be or are being synced to the local computing device 120.

In some embodiments, the user may select which document libraries or folders of document libraries from the subset of document libraries to sync to his or her local computing device 120 using a graphical user interface (such as the graphical user interface 400) or other human-machine interface. By selecting which document libraries 410-411 or folders 420 to sync to the local computing device 120, the user can control what devices have access to each of the document libraries 410-411. This is especially useful when setting up new user devices, such as for new hires or for existing employees receiving new user devices.

After the user has selected the document libraries to sync, the local computing device 120 (using the electronic processor 210) downloads at least a portion of the documents, files, images, and data from each of the selected document libraries or folders (for example, after a user has hit a sync button 430) to the memory 220. The electronic processor 210 may further set up a data link between the downloaded portion and the document library (such as one of the document libraries 140-143) such that, when the user edits the downloaded portion, one of the document libraries 140-143 is updated with the edits made by the user.

In some embodiments, the electronic processor 210 is configured to determine which files to sync from each of the subset of document libraries based upon applications available on the local computing device 120. For example, if the local computing device 120 has a word processing application, the electronic processor 210 syncs text files and documents to the local computing device 120. In another example, if the local computing device 120 has a spreadsheet application, the electronic processor 210 syncs spreadsheet files to the local computing device 120.

Thus, embodiments described herein provide, among other things, methods and systems for determining a document library to sync to a local computing device. Various features and advantages of some embodiments are set forth in the following claims.

What is claimed is:

1. A system for determining a document library to sync to a local computing device, the system comprising:
   an electronic processor configured to
   determine one or more document libraries associated with a user;
   determine, for each of the one or more document libraries, one or more relevant heuristics for the user, the one or more heuristics indicating an amount of interaction with the one or more document libraries;
   determine, for each heuristic of the one or more relevant heuristics, a numerical value for the heuristic;
   determine a ranking of the one or more document libraries based upon the numerical value of the one or more relevant heuristics; and
   determine, based upon the ranking, a subset of the one or more document libraries to sync to a local computing device associated with the user.

2. The system of claim 1, wherein the one or more heuristics is determined based upon a number of times the user has accessed each of the document libraries.

3. The system of claim 1, wherein the one or more heuristics is determined based upon a most recent access time to each of the document libraries by the user.

4. The system of claim 1, wherein the user is one of a plurality of users.

5. The system of claim 4, wherein the one or more heuristics is determined based upon one or more document libraries accessed by at least one other user of the plurality of users.

6. The system of claim 4, wherein the one or more heuristics is determined based upon a number of times each of the plurality of users has accessed each of the document libraries.

7. The system of claim 4, wherein the one or more heuristics based upon a most recent access time of each of the document libraries by at least one other user of the plurality of users.

8. The system of claim 1, the electronic processor further configured to present, using a display of the local computing device, the subset of document libraries to the user.

9. The system of claim 8, wherein the user selects at least one of the subset of document libraries to sync to the local computing device.

10. The system of claim 9, wherein the local computing devices syncs each of the selected document libraries.

11. A method for determining a document library to sync to a local computing device, the method comprising:
   determining, with an electronic processor, one or more document libraries associated with a user;
   determining, with the electronic processor, one or more relevant heuristics for each of the one or more document libraries, the one or more heuristics indicating an amount of interaction of the user with the one or more document libraries;
   determining, with the electronic processor, for each heuristic of the one or more relevant heuristics, a numerical value for the heuristic;
   determining, with the electronic processor, a ranking of the one or more document libraries based upon the numerical value of the one or more relevant heuristics; and
   determining, with the electronic processor, a subset of the one or more document libraries to sync to a local computing device associated with the user, wherein the subset is determined based upon the heuristic.

12. The method of claim 11, wherein the one or more heuristics is determined based upon a number of times the user has accessed each of the document libraries.

13. The method of claim 11, wherein the one or more heuristics is determined based upon a most recent accessed time to each of the document libraries by the user.

14. The method of claim 11, wherein the user is one of a plurality of users.

15. The method of claim 14, wherein the one or more heuristics is determined based upon one or more document libraries accessed by at least one other user of the plurality of users.

16. The method of claim 14, wherein the one or more heuristics is determined based upon a number of times each of the plurality of users has accessed each of the document libraries.

17. The method of claim 14, wherein the one or more heuristics is determined based upon a most recent access time of each of the document libraries by at least one other user of the plurality of users.

18. The method of claim 11, further comprising presenting, with the electronic processor, the subset of document libraries to the user on a display of the local computing device.

19. The method of claim 18, wherein the user selects at least one of the subset of document libraries to sync to the local computing device.

20. The method of claim 19, wherein the local computing devices syncs each of the selected document libraries.

* * * * *